United States Patent
Cheng et al.

(10) Patent No.: US 12,197,479 B2
(45) Date of Patent: Jan. 14, 2025

(54) SEMANTIC MATCHING AND RETRIEVAL METHOD AND APPARATUS AND NON-TRANSITORY COMPUTER-READABLE MEDIUM

(71) Applicants: Rui Cheng, Beijing (CN); Bin Dong, Beijing (CN); Shanshan Jiang, Beijing (CN); Lu Luo, Beijing (CN); Lei Ding, Beijing (CN)

(72) Inventors: Rui Cheng, Beijing (CN); Bin Dong, Beijing (CN); Shanshan Jiang, Beijing (CN); Lu Luo, Beijing (CN); Lei Ding, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/390,496

(22) Filed: Dec. 20, 2023

(65) Prior Publication Data

US 2024/0220523 A1 Jul. 4, 2024

(30) Foreign Application Priority Data

Dec. 30, 2022 (CN) .......................... 202211728994.X

(51) Int. Cl.
*G06F 16/33* (2019.01)
*G06N 3/045* (2023.01)

(52) U.S. Cl.
CPC ......... *G06F 16/3347* (2019.01); *G06N 3/045* (2023.01)

(58) Field of Classification Search
CPC ..... G06F 16/3347; G06N 3/045; Y02D 10/00
See application file for complete search history.

(56) References Cited

U.S. PATENT DOCUMENTS

| 6,006,221 A * | 12/1999 | Liddy ................. G06F 16/93 |
| | | 707/999.005 |
| 11,461,551 B1 * | 10/2022 | Thaine ............... G06F 16/3347 |
| 2019/0155913 A1 * | 5/2019 | Singal ................ G06F 16/3344 |
| 2020/0218746 A1 * | 7/2020 | Fan .......................... G06N 3/044 |
| 2022/0050847 A1 * | 2/2022 | Scebold ............. G06F 16/9032 |

OTHER PUBLICATIONS

Anil Sharma et al. "Ontology-based semantic retrieval of documents using Word2vec model", Data & Knowledge Engineering 144, pp. 1-18 (Year: 2021).*
Sun Kim et al., "Bridging the gap: Incorporating a semantic similarity measure for effectively mapping PubMed queries to documents", Journal of Biomedical Informatics 75, pp. 1-6 (Year: 2017).*

* cited by examiner

*Primary Examiner* — Jared M Bibbee
(74) *Attorney, Agent, or Firm* — IPUSA, PLLC

(57) ABSTRACT

Disclosed are a semantic matching and retrieval method and apparatus. The semantic matching and retrieval method includes steps of obtaining both the vector representation of a query text and the vector representation of a document text; obtaining the final vector representation of the query text; obtaining the final vector representation of the document text; calculating, based on the final vector representation of the query text and the final vector representation of the document text, the similarity score between the query text and the document text; and selecting, based on the similarity scores between the query text and a plurality of document texts, a document text matching the query text from the plurality of document texts.

14 Claims, 4 Drawing Sheets

SEMANTIC MATCHING AND RETRIEVAL METHOD AND APPARATUS AND NON-TRANSITORY COMPUTER-READABLE MEDIUM

BACKGROUND OF THE DISCLOSURE

1. Field of the Disclosure

The present disclosure relates to the technical field of machine learning and natural language processing (NLP), and specifically, a semantic matching and retrieval method and apparatus as well as a non-transitory computer-readable medium.

2. Description of the Related Art

By performing semantic matching on two natural language texts, the semantic similarity of the two texts may be obtained, and then, on the basis of the semantic similarity, it is possible to determine whether the semantics of the two texts are the same or similar. A semantic matching task may be used to measure the semantic similarity between a query side and a document (also called a "doc" for short) side. For a query currently input, finding a sentence most similar to the query from numerous documents on the doc side and returning it are of great significance in the retrieval field (e.g., a search engine) and the recommendation filed (e.g., advertising recommendation and video recommendation).

Regarding a semantic matching task, the most popular method in the art at present is one making use of a Siamese network. The Siamese network is, due to its fast online computation speed, widely utilized in a semantic matching task in the related industry. However, compared to a single-tower model, the matching accuracy of the Siamese network is relatively poor because the query side and the doc side in the Siamese network are mutually independent and lack interactive characteristics. As a result, the accuracy of the semantic matching task is relatively low.

SUMMARY OF THE DISCLOSURE

The present disclosure aims to provide a semantic matching and retrieval method and apparatus by which it is possible to improve the accuracy of a semantic matching task.

In order to solve the above technical problem, the present disclosure is implemented as follows.

According to a first aspect of the present disclosure, a semantic matching and retrieval method is provided that includes steps of obtaining both a vector representation of a query text, containing a vector representation of each character or word in the query text and a vector representation of a document text, containing a vector representation of each character or word in the document text; extracting, based on the vector representation of each character or word in the query text, an original feature and a self-attention feature of the query text, extracting, based on the vector representation of each character or word in the query text and the vector representation of each character or word in the document text, an interactive attention feature of the query text, and fusing the original feature, the self-attention feature, and the interactive attention feature of the query text to acquire a final vector representation of the query text; extracting, based on the vector representation of each character or word in the document text, an original feature and a self-attention feature of the document text, extracting, based on the vector representation of each character or word in the document text and the vector representation of each character or word in the query text, an interactive attention feature of the document text, and fusing the original feature, the self-attention feature, and the interactive attention feature of the document text to acquire a final vector representation of the document text; calculating, based on the final vector representation of the query text and the final vector representation of the document text, a similarity score between the query text and the document text; and selecting, based on the similarity scores between the query text and a plurality of document texts, a document text matching the query text from the plurality of document texts.

As an option, the extraction of the original feature of the query text includes inputting the vector representation of each character or word in the query text into a first deep learning network to acquire the original feature of the query text output from the first deep learning network, and the extraction of the original feature of the document text includes inputting the vector presentation of each character or word in the document text into a second deep learning network to acquire the original feature of the document text output from the second deep learning network.

As an option, the extraction of the self-attention feature of the query text includes calculating a self-attention weight of each character or word in the query text with respect to a target character or word in the query text, performing, based on the self-attention weight of each character or word in the query text with respect to the target character or word in the query text, weighted summation on the vector representation of each character or word in the query text to acquire a self-attention feature of the target character or word in the query text, and stitching the self-attention feature of each character or word in the query text to acquire the self-attention feature of the query text, and the extraction of the self-attention feature of the document text includes calculating a self-attention weight of each character or word in the document text with respect to a target character or word in the document text, performing, based on the self-attention weight of each character or word in the document text with respect to the target character or word in the document text, weighted summation on the vector representation of each character or word in the document text to acquire a self-attention feature of the target character or word in the document text, and stitching the self-attention feature of each character or word in the document text to acquire the self-attention feature of the document text.

As an option, the extraction of the interactive attention feature of the query text includes calculating an interactive attention weight of each character or word in the document text with respect to a target character or word in the query text, performing, based on the interactive attention weight of each character or word in the document text with respect to the target character or word in the query text, weighted summation on the vector representation of each character or word in the document text to acquire an interactive attention feature of the target character or word in the query text, and stitching the interactive attention feature of each character or word in the query text to acquire the interactive attention feature of the query text, and the extraction of the interactive attention feature of the document text includes calculating an interactive attention weight of each character or word in the query text with respect to a target character or word in the document text, performing, based on the interactive attention weight of each character or word in the query text with respect to the target character or word in the document text, weighted summation on the vector representation of each character or word in the query text to acquire an interactive attention feature of the target character or word in the document text, and stitching the interactive attention feature of each character or word in the document text to acquire the interactive attention feature of the document text.

As an option, the fusion of the original feature, the self-attention feature, and the interactive attention feature of the query text includes performing feature addition, feature stitching, or weighted summation on the original feature, the self-attention feature, and the interactive attention feature of the query text to acquire the final vector representation of the query text, and the fusion of the original feature, the self-attention feature, and the interactive attention feature of the document text includes performing feature addition, feature stitching, or weighted summation on the original feature, the self-attention feature, and the interactive attention feature of the document text to acquire the final vector representation of the document text.

As an option, the calculation of the similarity score between the query text and the document text on the basis of the final vector representation of the query text and the final vector representation of the document text includes calculating a cosine distance or a Manhattan distance between the final vector representation of the query text and the final vector representation of the document text to serve as the similarity score between the query text and the document text.

According to a second aspect of the present disclosure, a semantic matching and retrieval apparatus is provided that includes a first vector obtainment part configured to obtain a vector representation of a query text, containing a vector representation of each character or word in the query text; a second vector obtainment part configured to obtain a vector representation of a document text, containing a vector representation of each character or word in the document text; a first feature extraction part configured to extract, based on the vector representation of each character or word in the query text, an original feature and a self-attention feature of the query text, extract, based on the vector representation of each character or word in the query text and the vector representation of each character or word in the document text, an interactive attention feature of the query text, and fuse the original feature, the self-attention feature, and the interactive attention feature of the query text to obtain a final vector representation of the query text; a second feature extraction part configured to extract, based on the vector representation of each character or word in the document text, an original feature and a self-attention feature of the document text, extract, based on the vector representation of each character or word in the document text and the vector representation of each character or word in the query text, an interactive attention feature of the document text, and fuse the original feature, the self-attention feature, and the interactive attention feature of the document text to obtain a final vector representation of the document text; a similarity calculation part configured to calculate, based on the final vector representation of the query text and the final vector representation of the document text, a similarity score between the query text and the document text; and a selection part configured to select, based on the similarity scores between the query text and a plurality of document texts, a document text matching the query text from the plurality of document texts.

As an option, the first feature extraction part is inclusive of a first original feature extraction part configured to input the vector representation of each character or word in the query text into a first deep learning network to acquire the original feature of the query text output from the first deep learning network, and the second feature extraction part is inclusive of a second original feature extraction part configured to input the vector presentation of each character or word in the document text into a second deep learning network to acquire the original feature of the document text output from the second deep learning network.

As an option, the first feature extraction part is inclusive of a first self-attention feature extraction part configured to calculate a self-attention weight of each character or word in the query text with respect to a target character or word in the query text, perform, based on the self-attention weight of each character or word in the query text with respect to the target character or word in the query text, weighted summation on the vector representation of each character or word in the query text to acquire a self-attention feature of the target character or word in the query text, and stitch the self-attention feature of each character or word in the query text to acquire the self-attention feature of the query text, and the second feature extraction part is inclusive of a second self-attention feature extraction part configured to calculate a self-attention weight of each character or word in the document text with respect to a target character or word in the document text, perform, based on the self-attention weight of each character or word in the document text with respect to the target character or word in the document text, weighted summation on the vector representation of each character or word in the document text to acquire a self-attention feature of the target character or word in the document text, and stitch the self-attention feature of each character or word in the document text to acquire the self-attention feature of the document text.

As an option, the first feature extraction part is inclusive of a first interactive attention feature extraction part configured to calculate an interactive attention weight of each character or word in the document text with respect to a target character or word in the query text, perform, based on the interactive attention weight of each character or word in the document text with respect to the target character or word in the query text, weighted summation on the vector representation of each character or word in the document text to acquire an interactive attention feature of the target character or word in the query text, and stitch the interactive attention feature of each character or word in the query text to acquire the interactive attention feature of the query text, and the second feature extraction part is inclusive of a second interactive attention feature extraction part configured to calculate an interactive attention weight of each character or word in the query text with respect to a target character or word in the document text, perform, based on the interactive attention weight of each character or word in the query text with respect to the target character or word in the document text, weighted summation on the vector representation of each character or word in the query text to acquire an interactive attention feature of the target character or word in the document text, and stitch the interactive attention feature of each character or word in the document text to acquire the interactive attention feature of the document text.

As an option, the first feature extraction part is inclusive of a first fusion part configured to perform feature addition, feature stitching, or weighted summation on the original feature, the self-attention feature, and the interactive attention feature of the query text to acquire the final vector representation of the query text, and the second feature extraction part is inclusive of a second fusion part configured to perform feature addition, feature stitching, or weighted summation on the original feature, the self-attention feature, and the interactive attention feature of the document text to acquire the final vector representation of the document text.

As an option, the similarity calculation part is further configured to calculate a cosine distance or a Manhattan distance between the final vector representation of the query text and the final vector representation of the document text to serve as the similarity score between the query text and the document text.

According to a third aspect of the present disclosure, a non-transitory computer-readable medium is provided that stores a computer program containing computer-executable instructions for execution by a computer having a processor. The computer program causes, when executed by the processor, the processor to conduct the semantic matching and retrieval method according to the first aspect of the present disclosure.

Compared with the prior art, the semantic matching and retrieval method or apparatus in accordance with the embodiments of the present disclosure utilizes an attention mechanism to calculate self-side important features (i.e., self-attention features) and opposite-side interactive features (i.e., interactive attention features), and then, fuses the original features, the self-side important features, and the opposite-side interactive features to obtain final vector representations, so that the final vector representations may include both the self-side important features and the opposite-side interactive features, and by retaining these kinds of features in the final similarity calculation, it is possible to dramatically ameliorate the accuracy of a semantic matching task.

DETAILED DESCRIPTION OF THE PREFERRED EMBODIMENTS

In order to let a person skilled in the art better understand the present disclosure, hereinafter, the embodiments of the present disclosure are concretely described with reference to the drawings. However, it should be noted that the same symbols, that are in the specification and the drawings, stand for constituent elements having basically the same function and structure, and the repetition of the explanations to the constituent elements is omitted.

A semantic matching and retrieval method is provided according to the embodiments of the present disclosure. The semantic matching and retrieval method utilizes a self-attention mechanism to calculate self-side important features (i.e., self-attention features); utilizes an interactive attention mechanism to calculate opposite-side interactive features (i.e., interactive attention features); fuses the original features, the self-side important features, and the opposite-side interactive features to obtain final vector representations; and calculates a semantic similarity on the basis of the final vector representations. Because both the self-side important features and the opposite-side interactive features are retained in the calculation of the semantic similarity, the accuracy of a semantic matching task may be outstandingly improved. The semantic matching and retrieval method is particularly applicable for a Siamese network based semantic matching model, and may significantly ameliorate the accuracy of this type of model.

Figure 1:
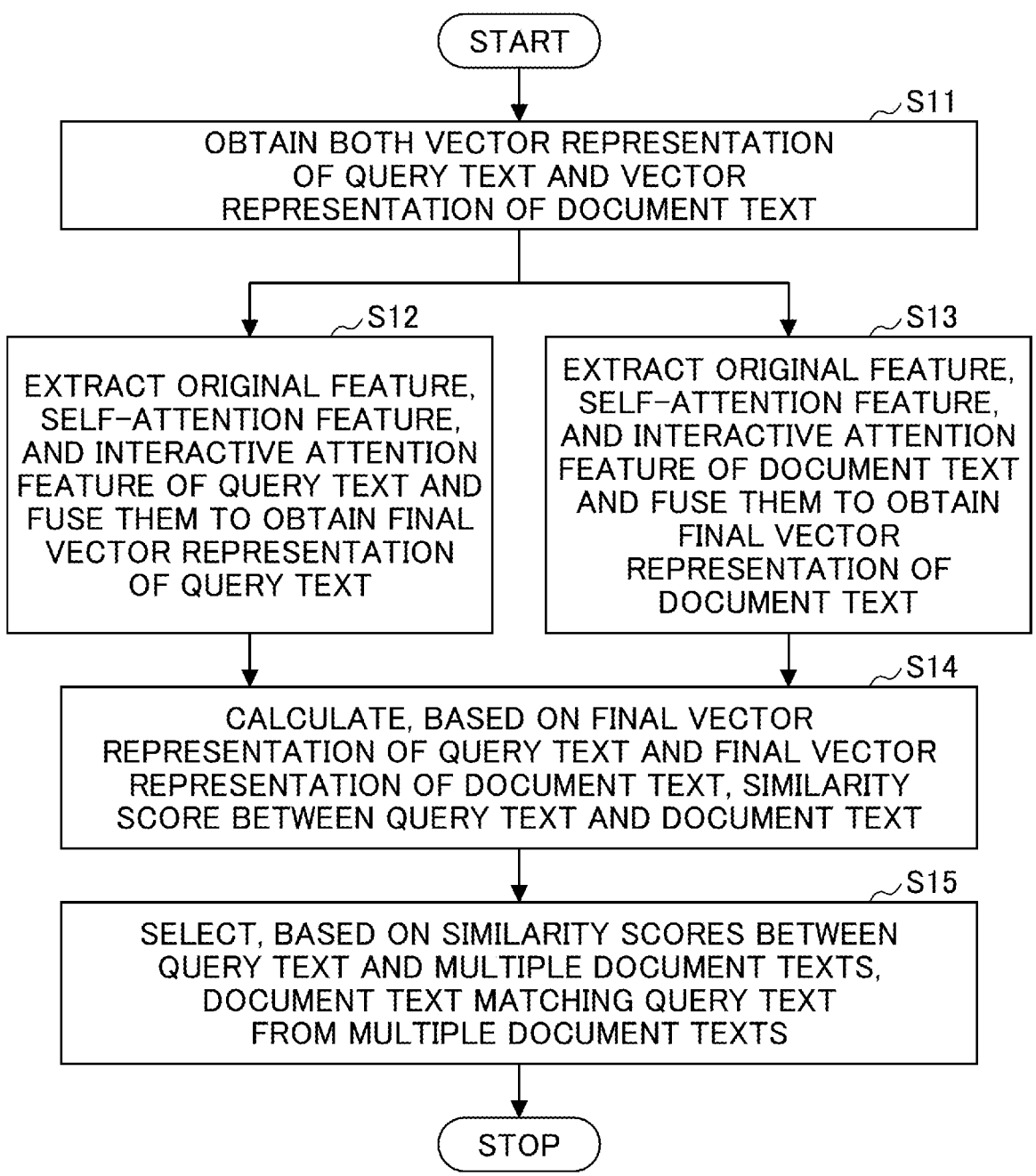
FIG. 1 is a flowchart of a semantic matching and retrieval method in accordance with an embodiment of the present disclosure.

Referring to FIG. 1; a semantic matching and retrieval method is provided in accordance with an embodiment of the present disclosure, by which it is possible to calculate the similarity score between a query text and a document text. Furthermore, by means of the semantic matching and retrieval method shown in FIG. 1, it is also possible to calculate the similarity scores between a query text and a plurality of document texts, so as to select, based on the ranking of the similarity scores, one or more document texts most similar to the query text from the plurality of document texts. As illustrated in FIG. 1, the semantic matching and retrieval method is inclusive of STEPS S11 to S15.

STEP S11 in FIG. 1 is obtaining the vector representation of a query text, including the vector representation of each character (e.g., a Chinese character) or word (e.g., an English word) in the query text, and obtaining the vector representation of a document text, including the vector representation of each character or word in the document text.

Here, both the query text and the document text are natural language texts. It is possible to adopt some existing vector conversion tools (e.g., GloVe and word2vec) to initialize the natural language texts (i.e., the query text and the document text) into feature vector representations. In STEP S11 of FIG. 1, each of the natural language texts is converted into a numerical vector that may be understood and calculated by a computer program. The numerical vector has a one-to-one relationship with the characters or words in the corresponding natural language text. It may be simply understood as mapping each character or word in the corresponding natural language text into the numerical vector. In STEPS S12 and S13 of FIG. 1, text feature vectors containing rich information will be further calculated and generated in combination with contextual information, etc., so the vector conversion in STEP S11 of FIG. 1 is also called "initialization".

It is assumed that a query text is q, and $q=(q_0, q_1, q_2, \ldots, q_n)$. That is, the query text is inclusive of n+1 characters or words. Here, $q_i$ stands for the character or word with the serial number i in the query text. For example, if the query text is "What medicine should I take when I have a cold?", then n is 10, $q_0$ is "What", $q_1$ is "medicine", $q_2$ is "should", . . . , and $q_{10}$ is "?". The vector representation corresponding to $q_i$ is expressed as $e_{qi}$ after the vector conversion of STEP S11 in FIG. 1 is conducted. In this way, it is possible to obtain the vector representation $E_q=(e_{q0}, e_{q1}, e_{q2}, \ldots, e_{qn})$ corresponding to the query text.

Similarly, it is assumed that a document text is d, and $d=(d_0, d_1, d_2, \ldots, d_m)$. That is, the document text is inclusive of m+1 characters or words. Here, $d_i$ stands for the character or word with the serial number i in the document text. For example, if the document text is "What medicine can treat a cold?", then m is 6, do is "What", $d_1$ is "medicine", $d_2$ is "can", . . . , and do is "?". The vector representation corresponding to $d_1$ is expressed as $e_{di}$ after the vector conversion of STEP S11 in FIG. 1 is conducted. In this way, it is possible to obtain the vector representation $E_d=(e_{d0}, e_{d1}, e_{d2}, \ldots, e_{dm})$ corresponding to the document text.

STEP S12 in FIG. 1 is extracting, based on the vector representation of each character or word in the query text, the original feature and the self-attention feature of the query text; extracting, based on the vector representation of each character or word in the query text and the vector representation of each character or word in the document text, the interactive attention feature of the query text; and fusing the original feature, the self-attention feature, and the interactive attention feature of the query text to acquire the final vector representation of the query text.

Here, it is possible to utilize, according to different input and feature requirements, different deep learning networks to extract the original feature of the query text. For example, the vector representation of each character or word in the query text may be input into a first deep learning network to acquire the original feature of the query text output by the first deep learning network. Taking a recurrent neural network (RNN) as an example, after the vector representation of each character or word in the query text is input into the recurrent neural network, the complex abstract feature $E_{q'}$ of the query text, i.e., the original feature of the query text is output from the recurrent neural network. Such a process may be expressed by the following equation (1).

$$E_{q'} = RNN(E_q) \tag{1}$$

In this embodiment, the extraction of the self-attention feature of the query text may specifically include calculating the self-attention weight of each character or word in the query text with respect to a target character or word in the query text; and performing, based on the self-attention weight of each character or word in the query text with respect to the target character or word in the query text, weighted summation on the vector representation of each character or word in the query text to acquire a self-attention feature of the target character or word in the query text. By using each character or word in the query text as a target character or word, the self-attention feature of each character or word in the query text may be calculated. Then, by stitching the self-attention feature of each character or word in the query text, it is possible to acquire the self-attention feature of the query text.

For example, if it is assumed that $q_i$ serves as a target character or word, then the self-attention feature $S_{qi}$ of $q_i$ may be calculated in accordance with the following equations (2) and (3).

$$W_{qi,qj} = \text{Attention}(e_{qi}, e_{qj}) = \text{softmax}\left(\frac{e_{qi}e_{qj}^T}{\sqrt{L}}\right) \tag{2}$$

$$S_{qi} = \sum_{e_{qj} \in E_q} W_{qi,qj} e_{qj} \tag{3}$$

In the above equations, $W_{qi,qj}$ denotes the self-attention weight of the character or word $q_j$ with the serial number j in the query text with respect to $q_i$; Attention $(e_{qi}, e_{qj})$ denotes the self-attention mechanism between the characters or words in the query text; $e_{qj}^T$ means performing a transpose operation on the vector $e_{qj}$; and L denotes the length of the vector $e_{qj}$.

For example, if a query text "What medicine should I take when I have a cold?" is taken as an illustration, then $q_0$ is "What", $q_1$ is "medicine", $q_2$ is "should", and so on. Here, if $q_i$ takes $q_0$, i.e., "What", then $q_j$ sequentially is $q_0$ (What), $q_1$ (medicine), $q_2$ (should), and so forth. At this time, the semantic importance relationship $(W_{q0,qj})$ between each character or word in the query text and $q_0$ is calculated as a weight, and then, weighted summation is performed on the vector representation of each character or word in the query text by utilizing the above equation (3), so that the self-attention feature of $q_0$ may be obtained. In this way, it is possible to obtain the self-attention feature of each character or word in the query text.

Subsequently, stitching is conducted in regard to the self-attention feature of each character or word in the query text in accordance with the following equation (4) to acquire the self-attention feature $S_q$ of the query text.

$$S_q = concat(S_{q0}, \ldots, S_{qn}) \tag{4}$$

In this embodiment, the extraction of the interactive feature of the query text may be specifically inclusive of calculating the interactive attention weight of each character or word in the document text with respect to a target character or word in the query text, and performing, based on the interactive attention weight of each character or word in the document text with respect to the target character or word in the query text, on the vector representation of each character or word in the document text to acquire the interactive attention feature of the target character or word in the query text. By letting each character or word in the query text be a target character or word, it is possible to calculate the interactive attention feature of each character or word in the query text. Then, by stitching the interactive attention feature of each character or word in the query text, the interactive attention feature of the query text may be obtained.

For example, if it is assumed that $q_i$ serves as a target character or word, then the interactive attention feature $F_{qi}$ of $q_i$ may be calculated according to the following equations (5) and (6).

$$W_{qi,dj} = \text{Attention}(e_{qi}, e_{dj}) = \text{softmax}\left(\frac{e_{qi}e_{dj}^T}{\sqrt{U}}\right) \tag{5}$$

$$F_{qi} = \sum_{e_{dj} \in E_d} W_{qi,dj} e_{dj} \tag{6}$$

In the above equations, $W_{qi,dj}$ represents the interactive attention weight of the character or word $d_j$ with the serial number j in the document text with respect to $q_i$; Attention $(e_{qi}, e_{qj})$ represents the interactive attention mechanism between the characters or words in the query text and in the document text; means performing a transpose operation on the vector $e_{dj}$; and U represents the length of the vector $e_{dj}$.

For example, if a query text "What medicine should I take when I have a cold?" is taken as an illustration, then $q_0$ is "What", $q_1$ is "medicine", $q_2$ is "should", and so forth, and if a document text "What medicine can treat a cold?" is taken as an illustration, then do is "What", $d_1$ is "medicine", de is "can", and so on.

Here, if $q_i$ takes $q_0$, i.e., "What", then $d_j$ may sequentially be do (What), $d_1$ (medicine), $d_2$ (can), and so on and so forth.

At this time, the semantic importance relationship ($W_{qi,dj}$) between each character or word in the document text and $q_0$ is calculated as a weight, and then, weighted summation is performed on the vector representation of each character and word in the document text by utilizing the above equation (6), so that the interactive attention feature of $q_0$ may be obtained. In this way, it is possible to obtain the interactive attention feature of each character or word in the query text.

Subsequently, by stitching the interactive attention feature of each character or word in the query text in accordance with the following equation (7), the interactive attention feature $F_q$ may be acquired.

$$F_q = concat(F_{q0}, \dots, F_{qn}) \quad (7)$$

After the original feature, the self-attention feature, and the interactive attention feature of the query text are obtained, it is possible to perform feature addition, feature stitching, or weighted summation on the original feature, the self-attention feature, and the interactive attention feature of the query text to acquire a calculation result, and then, make the calculation result be the final vector representation $E_{fin_q}$ of the query text as follows.

$$E_{fin_q} = merge(E_q, S_q, F_q) \quad (8)$$

STEP S13 of FIG. 1 is extracting, based on the vector representation of each character or word in the document text, the original feature and the self-attention feature of the document text; extracting, based on the vector representation of each character or word in the document text as well as the vector representation of each character or word in the query text, the interactive attention feature of the document text; and fusing the original feature, the self-attention feature, and the interactive attention feature of the document text to obtain the final vector representation of the document text.

Here, the way of generating the final vector representation of the document text is analogous to the way of generating the final vector representation of the query text. For example, it is possible to input the vector representation of each character or word in the document text into a second deep learning network to obtain the original feature of the document text output by the second deep learning network. The second deep learning network shares the weight values of the first deep learning network.

Furthermore, for example, it is possible to calculate the self-attention weight of each character or word in the document text with respect to a target character or word in the document text; perform, based on the self-attention weight of each character or word in the document text with respect to the target character or word in the document text, weighted summation on the vector representation of each character or word in the document text to obtain the self-attention feature of the target character or word in the document text; and stitch the self-attention feature of each character or word in the document text to obtain the self-attention feature of the document text.

Moreover, for example, it is possible to calculate the interactive attention weight of each character or word in the query text with respect to a target character or word in the document text; perform, based on the interactive attention weight of each character or word in the query text with respect to the target character or word in the document text, weighted summation on the vector representation of each character or word in the query text to obtain the interactive attention feature of the target character or word in the document text; and stitch the interactive attention feature of each character or word in the document text to obtain the interactive attention feature of the document text.

Subsequently, feature addition, feature stitching, or weighted summation is conducted in regard to the final feature, the self-attention feature, and the interactive attention feature of the document text to obtain the final vector representation $E_{fin_d}$ of the document text.

STEP S14 in FIG. 1 is calculating the similarity score between the query text and the document text on the basis of the final vector representation of the query text as well as the final vector representation of the document text.

Here, it is possible to calculate the cosine distance or the Manhattan distance between the final vector representation of the query text and the final vector representation of the document text to serve as the similarity score between the query text and the document text. For example, if a cosine distance is taken as an instance of the similarity score, then the similarity score may be expressed by the following equation.

$$P_{sim} = \cos(E_{fin_q}, E_{fin_d}) \quad (9)$$

In the above equation, $P_{sim}$ stands for the similarity score between $E_{fin_q}$ and $E_{fin_d}$.

By means of the above STEPS S11 to S14 of FIG. 1, the similarity score between a query text and a document text may be calculated in this embodiment. In addition, by repeatedly carrying out these STEPS S11 to S14, it is also possible to obtain the similarity scores between the query text and a plurality of document texts.

STEP S15 in FIG. 1 is selecting, based on the similarity scores between the query text and a plurality of document texts, a document text matching the query text from the plurality of document texts.

Here, one or more highest similarity scores are selected according to the order of similarity scores from high to low, and the document texts corresponding to the one or more highest similarity scores are output as the semantic matching result of the query text. For example, in the field of retrieval (e.g., a search engine), it is possible to utilize the semantic matching and retrieval method according to this embodiment to seek N document texts most relevant to a user's search content (i.e., a query text) and return them in order, where N is a predetermined positive integer. Again, for example, in the field of recommendation (e.g., advertising recommendation or video recommendation), it is possible to generate a query text on the basis of a user's daily behavior and/or user log, so as to return, based on the generated query text, the recommendation content most suitable or interesting for the user.

By way of the semantic matching and retrieval method in accordance with this embodiment, it is possible to retain both the important features of a text and the interactive features of a text on the opposite side in the calculation of the semantic similarity of the two texts, so that the accuracy of a semantic matching task may be dramatically improved.

Here, it should be noted that in this embodiment, the above STEPS S12 and S13 of FIG. 1 may be executed by taking advantage of a Siamese network with shared weights, respectively, so as to generate the final vector representation of the query text and the final vector representation of the document text.

Hereinafter, a semantic matching and retrieval apparatus is provided according to the embodiments of the present disclosure, that corresponds to the semantic matching and retrieval method according to the above embodiment.

Figure 2:
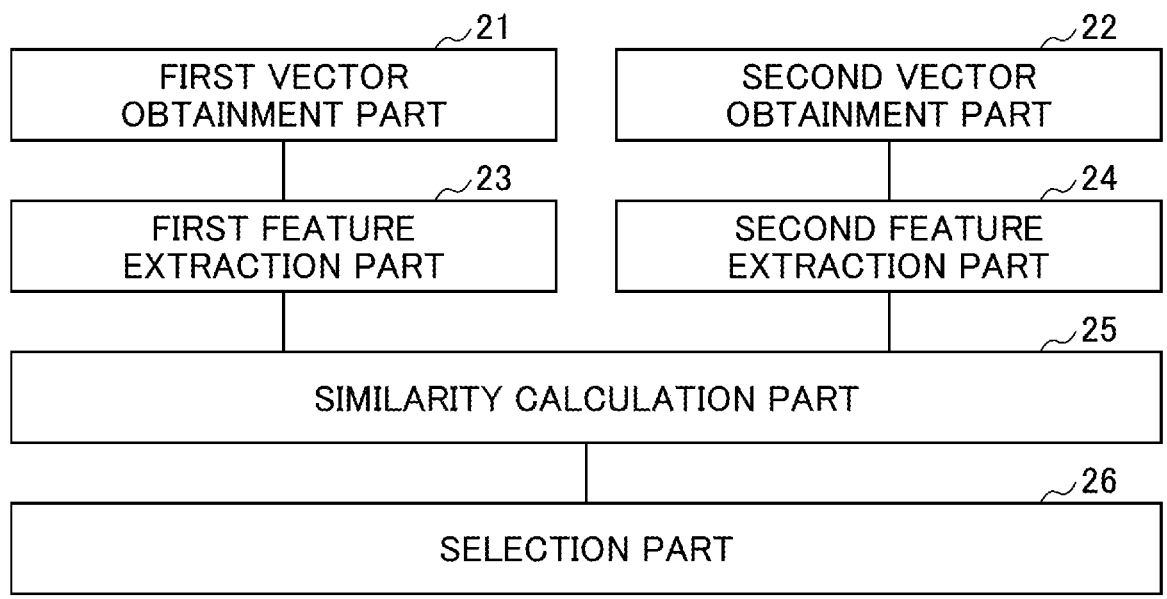
FIG. 2 illustrates a structure of a semantic matching and retrieval apparatus in accordance with another embodiment of the present disclosure.

Referring to FIG. 2; a semantic matching and retrieval apparatus is provided in accordance with an embodiment of the present disclosure, that includes a first vector obtainment part 21, a second vector obtainment part 22, a first feature extraction part 23, a second feature extraction part 24, a similarity calculation part 25, and a selection part 26.

The first vector obtainment part 21 is configured to obtain the vector representation of a query text. The vector representation of the query text is inclusive of the vector representation of each character or word in the query text.

The second vector obtainment part 22 is configured to obtain the vector representation of a document text. The vector representation of the document text is inclusive of the vector representation of each character or word in the document text.

The first feature extraction 23 is configured to extract, based on the vector representation of each character or word in the query text, the original feature and the self-attention feature of the query text; extract, based on the vector representation of each character or word in the query text as well as the vector representation of each character or word in the document text, the interactive attention feature of the query text; and fuse the original feature, the self-attention feature, and the interactive attention feature of the query text to obtain the final vector representation of the query text.

The second feature extraction part 24 is configured to extract, based on the vector representation of each character or word in the document text, the original feature and the self-attention feature of the document text; extract, based on the vector representation of each character or word in the document text as well as the vector representation of each character or word in the query text, the interactive attention feature of the document text; and fuse the original feature, the self-attention feature, and the interactive attention feature of the document text to obtain the final vector representation of the document text.

The similarity score calculation part 25 is configured to calculate, based on the final vector representation of the query text and the final vector representation of the document text, the similarity score between the query text and the document text.

The selection part 26 is configured to select, based on the similarity scores between the query text and a plurality of document texts, a document text matching the query text from the plurality of document texts.

By means of the above parts in the semantic matching and retrieval apparatus according to this embodiment, it is possible to outstandingly improve the accuracy of a semantic matching task.

Figure 3:
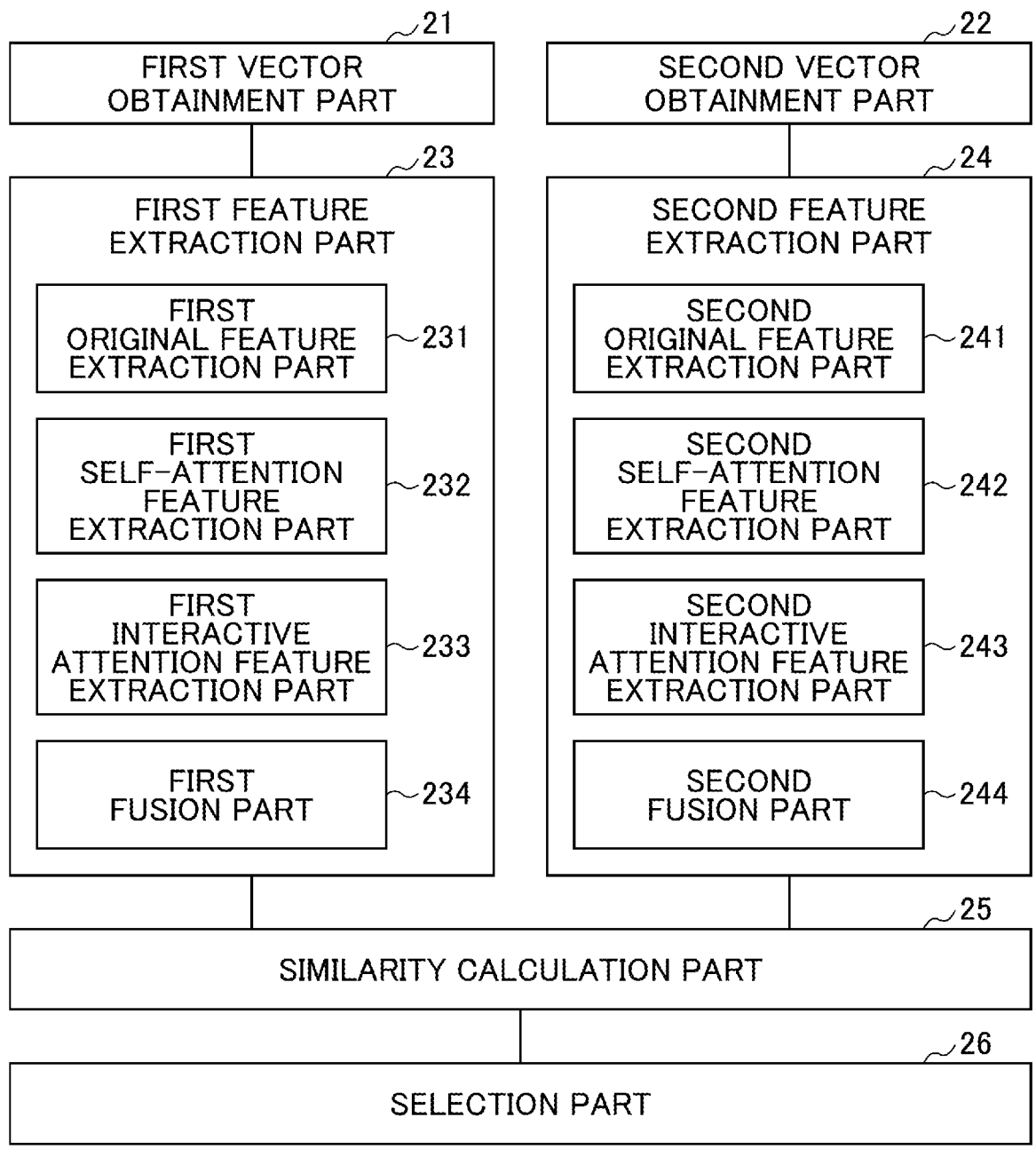
FIG. 3 shows a structure of a semantic matching and retrieval apparatus in accordance with still another embodiment of the present disclosure.

Optionally, as shown in FIG. 3, the first feature extraction part 23 contains a first original feature extraction part 231, a self-attention feature extraction part 232, a first interactive attention feature extraction part 233, and a first fusion part 234.

The first original feature extraction part 231 is configured to input the vector representation of each character or word in the query text into a first deep learning network to acquire the original feature of the query text output from the first deep learning network.

The first self-attention feature extraction part 232 is configured to calculate the self-attention weight of each character or word in the query text with respect to a target character or word in the query text; perform, based on the self-attention weight of each character or word in the query text with respect to the target character or word in the query text, weighted summation on the vector representation of each character or word in the query text to acquire the self-attention feature of the target character or word in the query text; and stitch the self-attention feature of each character or word in the query text to acquire the self-attention feature of the query text.

The first interactive attention feature extraction part 233 is configured to calculate the interactive attention weight of each character or word in the document text with respect to a target character or word in the query text; perform, based on the interactive attention weight of each character or word in the document text with respect to the target character or word in the query text, weighted summation on the vector representation of each character or word in the document text to acquire the interactive attention feature of the target character or word in the query text; and stitch the interactive attention feature of each character or word in the query text to acquire the interactive attention feature of the query text.

The first fusion part 234 is configured to perform feature addition, feature stitching, or weighted summation on the original feature, the self-attention feature, and the interactive attention feature in the query text to acquire the final vector representation of the query text.

Optionally, as illustrated in FIG. 3, the second feature extraction part 24 contains a second original feature extraction part 241, a second self-attention feature extraction part 242, a second interactive attention feature exaction part 243, and a second fusion part 244.

The second original feature extraction part 241 is configured to extract the original feature of the document text. In particular, the second original feature extraction part 241 is configured to input the vector representation of each character or word in the document text into a second deep learning network to acquire the original feature of the document text output by the second deep learning network.

The second self-attention feature extraction part 242 is configured to calculate the self-attention weight of each character or word in the document text with respect to a target character or word in the document text; perform, based on the self-attention weight of each character or word in the document text with respect to the target character or word in the document text, weighted summation on the vector representation of each character or word in the document text to acquire the self-attention feature of the target character or word in the document text; and stitch the self-attention feature of each character or word in the document text to acquire the self-attention feature of the document text.

The second interactive attention feature extraction part 243 is configured to calculate the interactive attention weight of each character or word in the query text with respect to a target character or word in the document text; perform, based on the interactive attention weight of each character or word in the query text with respect to the target character or word in the document text, weighted summation on the vector representation of each character or word in the query text to acquire the interactive attention feature of the target character or word in the document text; and stitch the interactive attention feature of each character or word in the document text to acquire the interactive attention feature of the document text.

The second fusion part 244 is configured to perform feature addition, feature stitching, or weighted summation on the original feature, the self-attention feature, and the interactive attention feature of the document text to acquire the final vector representation of the document text.

As an option, the similarity score calculation part 25 is further configured to calculate the cosine distance or the Manhattan distance between the final vector representation of the query text and the final vector representation of the document text to serve as the similarity score between the query text and the document text.

In what follows, another semantic matching and retrieval apparatus according to the embodiments of the present disclosure is provided.

Figure 4:
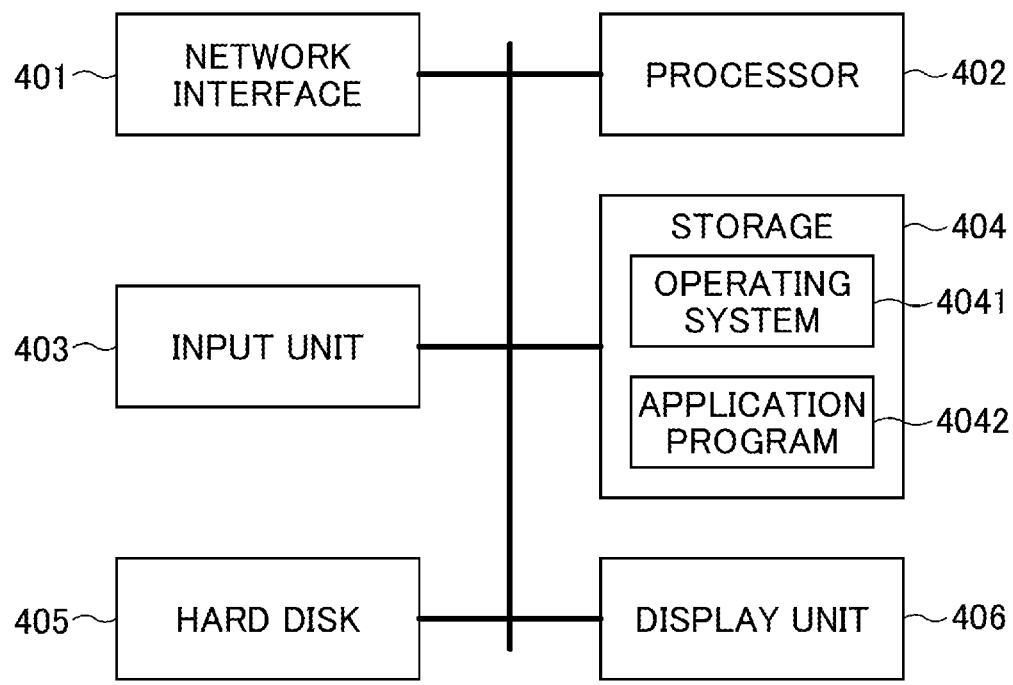
FIG. 4 presents a structure of a semantic matching and retrieval apparatus in accordance with yet another embodiment of the present disclosure.

Referring to FIG. 4; a semantic matching and retrieval apparatus is provided in accordance with an embodiment of the present disclosure, that is inclusive of a processor 402 and a storage 404 in which an operating system 4041 and an application program 4042 is stored.

When the application program 4042 is executed by the processor 402, the application program 4042 may cause the processor 402 to carry out the semantic matching and retrieval method according to the above embodiment, i.e., STEPS S11 to S15 in FIG. 1.

In addition, as presented as FIG. 4, the semantic matching and retrieval apparatus further contains a network interface 401, an input unit 403, a hard disk 405, and a display unit 406.

The network interface 401 may be configured to connect to a network such as the Internet, a local area network (LAN), or the like. The input unit 403 may be configured to let a user input various instructions, that may be a keyboard or a touch panel, for example. The hard disk 405 may be employed to store any information or data necessary to achieve the semantic matching and retrieval method in accordance with the above embodiment. The display unit 406 may be used to display the result acquired when executing the application program 4042 by the processor 402.

Furthermore, a computer-executable program and a non-transitory computer-readable medium are further provided. The computer-executable program may cause a computer to perform the semantic matching and retrieval method according to the above embodiment, i.e., STEPS S11 to S15 in FIG. 1. The non-transitory computer-readable medium may store computer-executable instructions (i.e., the computer-executable program) for execution by a computer involving a processor. The computer-executable instructions may cause, when executed by the processor, the processor to execute the semantic matching and retrieval method according to the above embodiment, i.e., STEPS S11 to S15 in FIG. 1.

Moreover, the above embodiments are just exemplary ones, and the specific structure and operation of them may not be used for limiting the present disclosure.

In addition, the embodiments of the present disclosure may be implemented in any convenient form, for example, using dedicated hardware or a mixture of dedicated hardware and software. The embodiments of the present disclosure may be implemented as computer software executed by one or more networked processing apparatuses. The network may include any conventional terrestrial or wireless communications network, such as the Internet. The processing apparatuses may include any suitably programmed apparatuses such as a general-purpose computer, a personal digital assistant, a mobile telephone (such as a WAP or 3G, 4G, or 5G-compliant phone) and so on. Since the embodiments of the present disclosure may be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform may include any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 202211728994.X filed on Dec. 30, 2022, the entire contents of which are hereby incorporated by reference.

What is claimed is:

1. A semantic matching and retrieval method comprising:
    obtaining both a vector representation of a query text and a vector representation of a document text, wherein, the vector representation of the query text contains a vector representation of each character or word in the query text, and the vector representation of the document text contains a vector representation of each character or word in the document text;
    extracting, based on the vector representation of each character or word in the query text, an original feature and a self-attention feature of the query text, extracting, based on the vector representation of each character or word in the query text as well as the vector representation of each character or word in the document text, an interactive attention feature of the query text, and fusing the original feature, the self-attention feature, and the interactive attention feature of the query text to obtain a final vector representation of the query text;
    extracting, based on the vector representation of each character or word in the document text, an original feature and a self-attention feature of the document text, extracting, based on the vector representation of each character or word in the document text as well as the vector representation of each character or word in the query text, an interactive attention feature of the document text, and fusing the original feature, the self-attention feature, and the interactive attention feature of the document text to obtain a final vector representation of the document text;
    calculating, based on the final vector representation of the query text as well as the final vector representation of the document text, a similarity score between the query text and the document text; and selecting, based on the similarity scores between the query text and a plurality of document texts, a document text matching the query text from the plurality of document texts.

2. The semantic matching and retrieval method according to claim 1, wherein, the extraction of the original feature of the query text includes inputting the vector representation of each character or word in the query text into a first deep learning network to acquire the original feature of the query text output by the first deep learning network, and the extraction of the original feature of the document text includes inputting the vector presentation of each character or word in the document text into a second deep learning network to acquire the original feature of the document text output by the second deep learning network.

3. The semantic matching and retrieval method according to claim 1, wherein, the extraction of the self-attention feature of the query text includes calculating a self-attention weight of each character or word in the query text with respect to a target character or word in the query text;

performing, based on the self-attention weight of each character or word in the query text with respect to the target character or word in the query text, weighted summation on the vector representation of each character or word in the query text to acquire a self-attention feature of the target character or word in the query text; and stitching the self-attention feature of each character or word in the query text to acquire the self-attention feature of the query text, and the extraction of the self-attention feature of the document text includes calculating a self-attention weight of each character or word in the document text with respect to a target character or word in the document text;

performing, based on the self-attention weight of each character or word in the document text with respect to the target character or word in the document text, weighted summation on the vector representation of each character or word in the document text to acquire a self-attention feature of the target character or word in the document text; and stitching the self-attention feature of each character or word in the document text to acquire the self-attention feature of the document text.

4. The semantic matching and retrieval method according to claim 1, wherein, the extraction of the interactive attention feature of the query text includes calculating an interactive attention weight of each character or word in the document text with respect to a target character or word in the query text;

performing, based on the interactive attention weight of each character or word in the document text with respect to the target character or word in the query text, weighted summation on the vector representation of each character or word in the document text to acquire an interactive attention feature of the target character or word in the query text; and stitching the interactive attention feature of each character or word in the query text to acquire the interactive attention feature of the query text, and the extraction of the interactive attention feature of the document text includes calculating an interactive attention weight of each character or word in the query text with respect to a target character or word in the document text;

performing, based on the interactive attention weight of each character or word in the query text with respect to the target character or word in the document text, weighted summation on the vector representation of each character or word in the query text to acquire an interactive attention feature of the target character or word in the document text; and stitching the interactive attention feature of each character or word in the document text to acquire the interactive attention feature of the document text.

5. The semantic matching and retrieval method according to claim 1, wherein, the fusion of the original feature, the self-attention feature, and the interactive attention feature of the query text includes performing feature addition, feature stitching, or weighted summation on the original feature, the self-attention feature, and the interactive attention feature of the query text to acquire the final vector representation of the query text, and the fusion of the original feature, the self-attention feature, and the interactive attention feature of the document text includes performing feature addition, feature stitching, or weighted summation on the original feature, the self-attention feature, and the interactive attention feature of the document text to acquire the final vector representation of the document text.

6. The semantic matching and retrieval method according to claim 1, wherein, the calculation of the similarity score between the query text and the document text based on the final vector representation of the query text as well as the final vector representation of the document text includes calculating a cosine distance or a Manhattan distance between the final vector representation of the query text and the final vector representation of the document text to serve as the similarity score between the query text and the document text.

7. A semantic matching and retrieval apparatus comprising:

a first vector obtainment part configured to obtain a vector representation of a query text, wherein, the vector representation of the query text contains a vector representation of each character or word in the query text;

a second vector obtainment part configured to obtain a vector representation of a document text, wherein, the vector representation of the document text contains a vector representation of each character or word in the document text;

a first feature extraction part configured to extract, based on the vector representation of each character or word in the query text, an original feature and a self-attention feature of the query text, extract, based on the vector representation of each character or word in the query text as well as the vector representation of each character or word in the document text, an interactive attention feature of the query text, and fuse the original feature, the self-attention feature, and the interactive attention feature of the query text to obtain a final vector representation of the query text;

a second feature extraction part configured to extract, based on the vector representation of each character or word in the document text, an original feature and a self-attention feature of the document text, extract, based on the vector representation of each character or word in the document text as well as the vector representation of each character or word in the query text, an interactive attention feature of the document text, and fuse the original feature, the self-attention feature, and the interactive attention feature of the document text to obtain a final vector representation of the document text;

a similarity calculation part configured to calculate, based on the final vector representation of the query text as well as the final vector representation of the document text, a similarity score between the query text and the document text; and a selection part configured to select, based on the similarity scores between the query text and a plurality of document texts, a document text matching the query text from the plurality of document texts.

8. The semantic matching and retrieval apparatus according to claim 7, wherein,
the first feature extraction part includes a first original feature extraction part configured to input the vector representation of each character or word in the query text into a first deep learning network to acquire the original feature of the query text output by the first deep learning network, and
the second feature extraction part includes a second original feature extraction part configured to input the vector presentation of each character or word in the document text into a second deep learning network to acquire the original feature of the document text output by the second deep learning network.

9. The semantic matching and retrieval apparatus according to claim 7, wherein,
the first feature extraction part includes a first self-attention feature extraction part configured to
calculate a self-attention weight of each character or word in the query text with respect to a target character or word in the query text;
perform, based on the self-attention weight of each character or word in the query text with respect to the target character or word in the query text, weighted summation on the vector representation of each character or word in the query text to acquire a self-attention feature of the target character or word in the query text; and
stitch the self-attention feature of each character or word in the query text to acquire the self-attention feature of the query text, and
the second feature extraction part includes a second self-attention feature extraction part configured to
calculate a self-attention weight of each character or word in the document text with respect to a target character or word in the document text;
perform, based on the self-attention weight of each character or word in the document text with respect to the target character or word in the document text, weighted summation on the vector representation of each character or word in the document text to acquire a self-attention feature of the target character or word in the document text; and
stitch the self-attention feature of each character or word in the document text to acquire the self-attention feature of the document text.

10. The semantic matching and retrieval apparatus according to claim 7, wherein,
the first feature extraction part includes a first interactive attention feature extraction part configured to
calculate an interactive attention weight of each character or word in the document text with respect to a target character or word in the query text;
perform, based on the interactive attention weight of each character or word in the document text with respect to the target character or word in the query text, weighted summation on the vector representation of each character or word in the document text to acquire an interactive attention feature of the target character or word in the query text; and
stitch the interactive attention feature of each character or word in the query text to acquire the interactive attention feature of the query text, and
the second feature extraction part includes a second interactive attention feature extraction part configured to
calculate an interactive attention weight of each character or word in the query text with respect to a target character or word in the document text;
perform, based on the interactive attention weight of each character or word in the query text with respect to the target character or word in the document text, weighted summation on the vector representation of each character or word in the query text to acquire an interactive attention feature of the target character or word in the document text; and
stitch the interactive attention feature of each character or word in the document text to acquire the interactive attention feature of the document text.

11. The semantic matching and retrieval apparatus according to claim 7, wherein,
the first feature extraction part includes a first fusion part configured to perform feature addition, feature stitching, or weighted summation on the original feature, the self-attention feature, and the interactive attention feature of the query text to acquire the final vector representation of the query text, and
the second feature extraction part includes a second fusion part configured to perform feature addition, feature stitching, or weighted summation on the original feature, the self-attention feature, and the interactive attention feature of the document text to acquire the final vector representation of the document text.

12. The semantic matching and retrieval apparatus according to claim 7, wherein,
the similarity calculation part is further configured to calculate a cosine distance or a Manhattan distance between the final vector representation of the query text and the final vector representation of the document text to serve as the similarity score between the query text and the document text.

13. A non-transitory computer-readable medium having a computer program for execution by a processor, wherein, the computer program causes, when executed by the processor, the processor to implement the semantic matching and retrieval method according to claim 1.

14. A semantic matching and retrieval apparatus comprising:
a processor; and
a storage storing a computer program, coupled to the processor, wherein, the computer program causes, when executed by the processor, the processor to implement the semantic matching and retrieval method according to claim 1.

\* \* \* \* \*